Figures 1, 3:
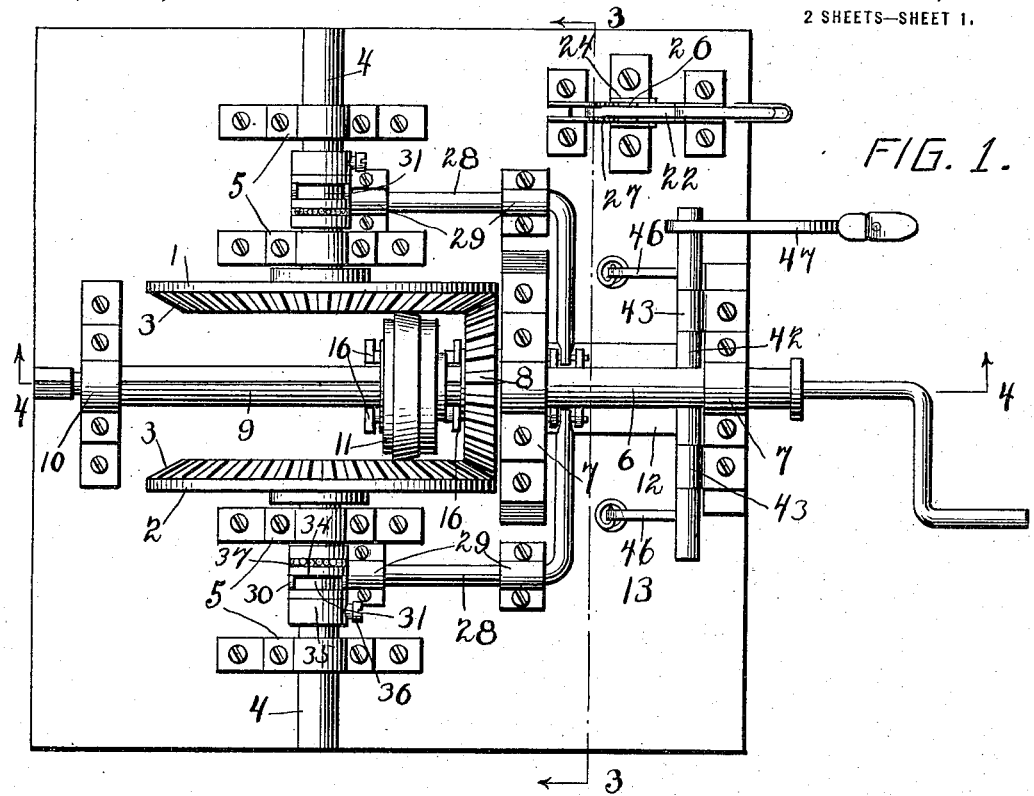

E. A. NORTON.
AUTO TRANSMISSION.
APPLICATION FILED SEPT. 4, 1915.

1,168,103.

Patented Jan. 11, 1916.
2 SHEETS—SHEET 1.

Witnesses
Wm. F. Doyle.
L. R. Fiedler.

Inventor
E. A. Norton
By Franklin N. Hough
Attorney

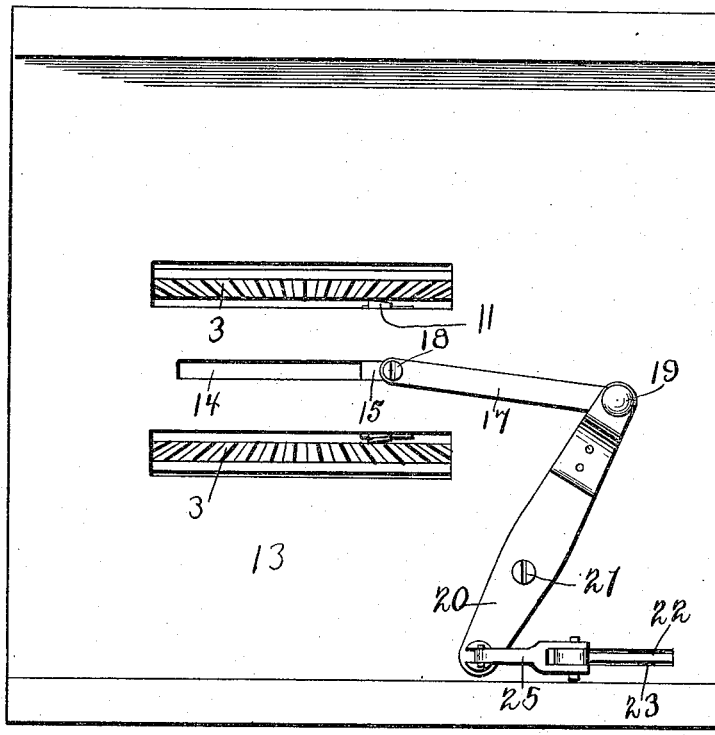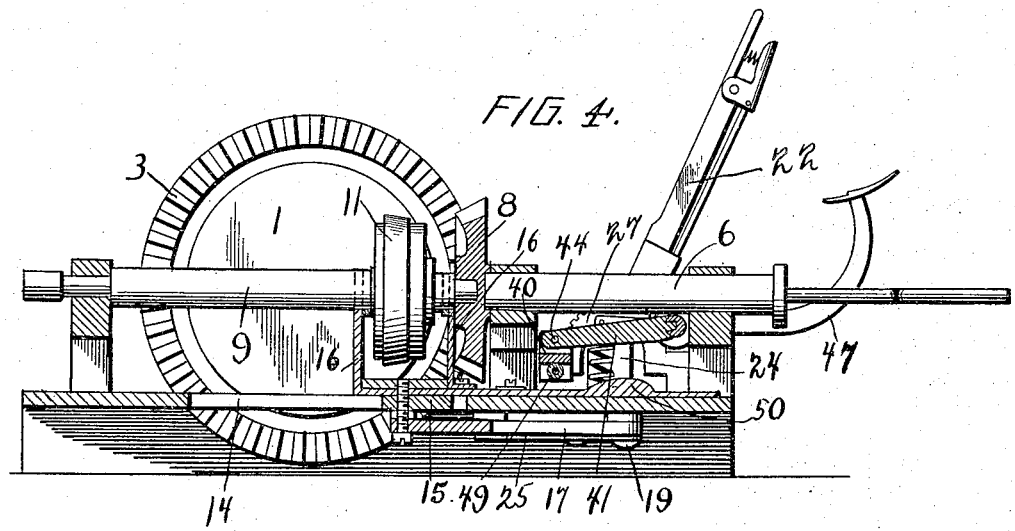

UNITED STATES PATENT OFFICE.

EDMUND A. NORTON, OF NIAGARA FALLS, NEW YORK.

AUTO TRANSMISSION.

1,168,103.   Specification of Letters Patent.   Patented Jan. 11, 1916.

Application filed September 4, 1915. Serial No. 49,123.

*To all whom it may concern:*

Be it known that I, EDMUND A. NORTON, a citizen of the United States, residing at Niagara Falls, in the county of Niagara and State of New York, have invented certain new and useful Improvements in Auto Transmissions; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in auto transmission apparatus and consists of a simple and efficient apparatus of this nature having various details of construction, combinations and arrangements of parts which will be hereinafter fully described, shown in the accompanying drawings and then specifically defined in the appended claims.

My invention is illustrated in the accompanying drawings, in which:

Figure 1 is a top plan view of my invention. Fig. 2 is a bottom plan view. Fig. 3 is a sectional view on line 3—3 of Fig. 1. Fig. 4 is a sectional view on line 4—4 of Fig. 1.

Reference now being had to the details of the drawings by numeral, 1 and 2 designate friction disks having beveled teeth 3 upon the inner faces thereof adjacent to their outer peripheries and each friction disk is fixed to a shaft 4 journaled in suitable bearings 5. A driving shaft, designated by numeral 6, is mounted in the bearings 7 in a line midway between the two disks and has a beveled gear 8 fixed thereto which is in mesh with the series of teeth upon said friction disk. A shaft 9 is journaled at its outer end in suitable bearings 10 and telescopes over the inner end of the shaft 4 and has a friction disk 11 splined thereto. A carriage, designated by numeral 12, is mounted to have a sliding horizontal movement upon the floor 13, which floor is provided with a slot 14 and a lug 15 projects from said carriage and is movable in said slot. Arms 16 rise from said carriage and are forked at their upper ends, adapted to engage one upon either side of the friction disk 11, which latter is provided with a circumferential fibrous surface. A link 17 is pivoted at 18 to said lug which projects from the carriage, said link being pivotally connected at 19 to one end of a lever 20 pivotally mounted upon a pin 21. An operating lever, designated by numeral 22, is pivotally mounted upon a pin 23 carried by the bracket arms 24 and its lower end is pivotallly connected through the medium of the link 25 with the lever 20. Said lever 22 carries a spring-pressed pawl 26 for engagement with the teeth of the segment members 27 mounted upon the floor, as shown clearly in the drawings, said lever mechanism being adapted for the purpose of throwing the friction disk 11 so that points diametrically opposite thereon will engage the adjacent faces of the frictional driven disks to cause said disk 11 to rotate in one direction or the other.

Rock shafts, designated by numeral 28, are mounted in bearings 29 upon the upper surface of said floor and at the inner end of each rock shaft is a forked member 30 adapted to engage annular grooves 31 in the collar 34, said collars being loosely mounted upon the shafts 4. Collars 35 are held by set screws 36 upon the shafts against said grooved collars and ball bearings 37 are mounted in raceways in the members 39 which bear against the opposite faces of the grooved collars. Each of said rock shafts has corresponding ends bent as shown in top plan view toward each other and are pivotally connected to the pins 39 upon the yoke 40, and 41 designates an arm projecting from a rock shaft 42 journaled in the bearings 43, said arm 41 being pivotally connected to the pin 44 upon the yoke. Fingers 46 project from the rock shaft 42 and the springs are connected to said fingers and to the floor, serving to normally return the shaft 42 to its normal position after the same has been rocked by the depression of the tread member 46 upon the arm 47. Said yoke carries an anti-friction roller 49 which is normally positioned in the path of the inclined cam-shaped member 50 upon said carriage.

In operation, a continuous motion in one direction is imparted to the driving shaft which will cause the two friction disks with annular teeth upon their inner faces to rotate in opposite directions. The friction disk 11, which is splined upon the hollow shaft, may be thrown to different relative positions intermediate the two friction disks which are rotating in opposite directions, accordingly as it may be desired to cause the disk 11 and the shaft carrying the same to rotate in one direction or the other, the speed of the disk 11 being determined by its position relative to the other disks, being driven faster when rotating in contact with the adjacent faces of the other disk near their outer edges.

When the disk 11 is thrown from position in contact with the disk at one side of the center to positions upon the other side of the center, the cam 50 upon said carriage will come in contact with the anti-friction roller upon the yoke and cause the two shafts connected to the yoke to rock and in turn will cause the two shafts 4 to be thrown outward in opposite directions a slight distance, sufficiently so that the inner faces of the two disks, which are parallel to each other, will be far from contact with the disk 11, thus causing the latter to be at rest for a moment while the disk 11 passes the center of the two frictionally driving disks.

By the provision of the rock shaft having the tread member thereon, emergency means is provided whereby the same movement may be imparted to the rock shafts which are pivoted to the yoke for the purpose of quickly stopping the rotary movement of the disk 11 by causing the other disks, which are parallel to each other, to separate slightly but still to be in geared connection with the gear wheel which is mounted upon the driving shaft.

What I claim to be new is:—

1. A transmission apparatus for automobiles, etc., comprising a driving shaft with a gear wheel fixed thereto, oppositely disposed frictional gear disks with gear teeth engaging said gear wheel, a hollow shaft telescoping said driving shaft, a friction disk splined to said hollow shaft, a carriage and means projecting therefrom for engagement with the friction disk to move the same upon the hollow shaft, a cam upon said carriage, rock shafts, a yoke pivoted to the rock shafts, anti-friction rollers carried by the yoke and in the path of said cam, and means actuated by the rocking of said shafts to cause the friction gears to move toward or away from each other.

2. A transmission apparatus for automobiles, etc., comprising a driving shaft with a gear wheel fixed thereto, oppositely disposed frictional gear disks with gear teeth engaging said gear wheel, a hollow shaft telescoping said driving shaft, a friction disk splined to said hollow shaft, a carriage and means projecting therefrom for engagement with the friction disks to move the same upon the hollow shaft, a cam upon said carriage, rock shafts, a yoke pivoted to the rock shafts, anti-friction rollers carried by the yoke and in the path of said cam, an emergency foot-operated rock shaft having pivotal connections with said yoke, and means for moving the friction disks toward or away from each other as the rock shafts are operated.

3. A transmission apparatus for automobiles, etc., comprising a driving shaft with a gear wheel fixed thereto, oppositely disposed frictional gear disks with gear teeth engaging said gear wheel, a hollow shaft telescoping said driving shaft, a friction disk splined to said hollow shaft, a carriage and means projecting therefrom for engagement with the friction disk to move the same upon the hollow shaft, a cam upon said carriage, rock shafts, a yoke pivoted to the rock shafts, anti-friction rollers carried by the yoke and in the path of said cam, an emergency spring-actuated rock shaft with depressible arm thereon, collars upon the shafts of the friction gears, and forked portions of the rock shafts engaging said collars to move the friction gears from each other.

EDMUND A. NORTON.

Copies of this patent may be obtained for five cents each, by addressing the "Commissioner of Patents, Washington, D. C."